Dec. 15, 1953  M. L. RIGGS  2,662,605
RETRACTABLE FOG-BEAM LIGHT FOR VEHICLES
Filed July 21, 1950  2 Sheets-Sheet 1
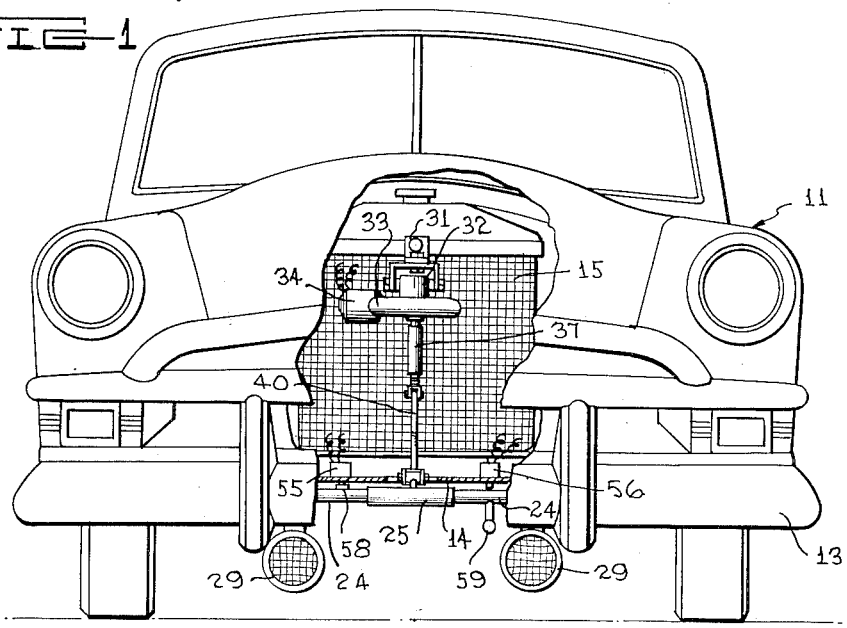
FIG-1
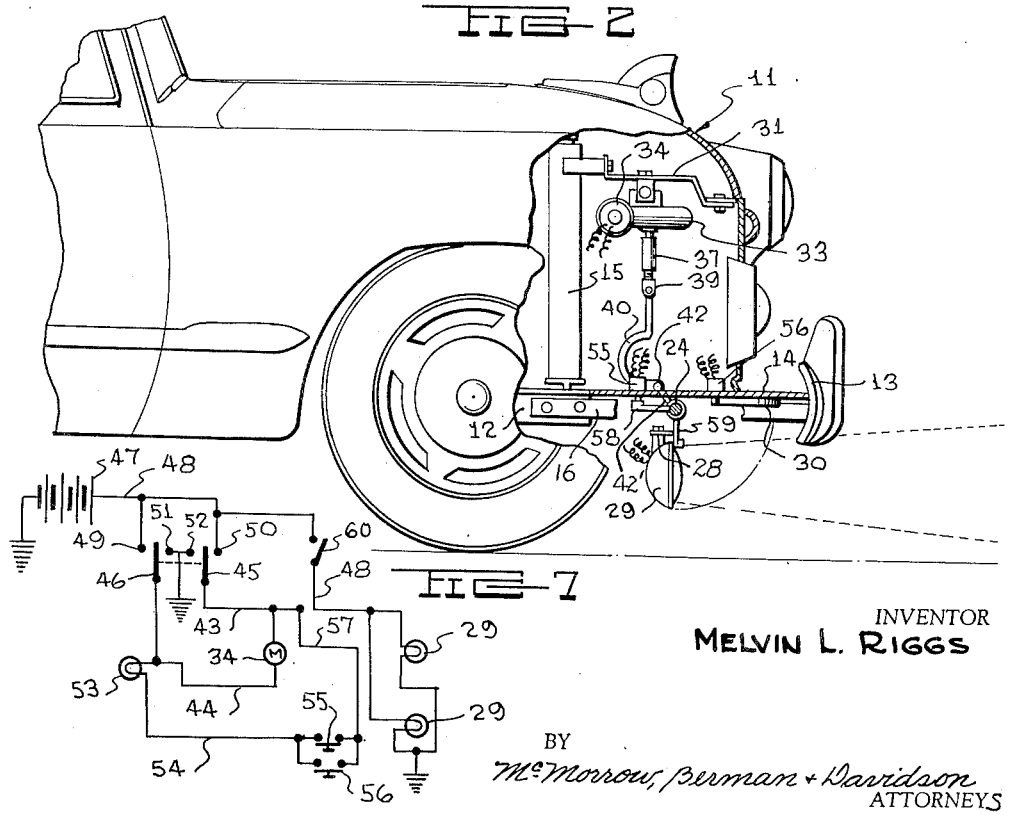
FIG-2
FIG-7
INVENTOR
MELVIN L. RIGGS
BY
McMorrow, Berman + Davidson
ATTORNEYS Dec. 15, 1953       M. L. RIGGS       2,662,605
RETRACTABLE FOG-BEAM LIGHT FOR VEHICLES
Filed July 21, 1950       2 Sheets-Sheet 2
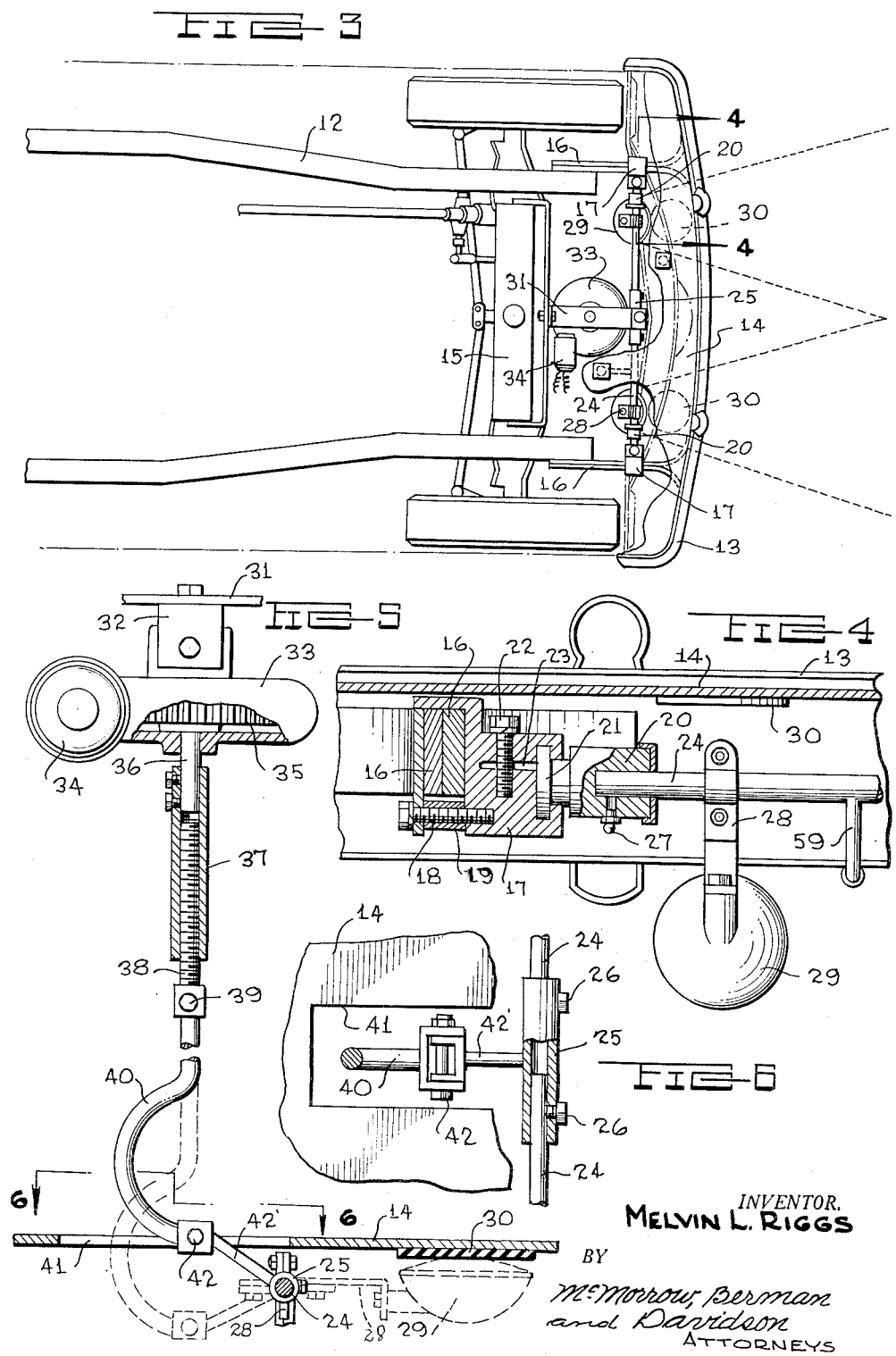
INVENTOR.
MELVIN L. RIGGS
BY
McMorrow, Berman
and Davidson
ATTORNEYS Patented Dec. 15, 1953

2,662,605

UNITED STATES PATENT OFFICE 2,662,605

RETRACTABLE FOG-BEAM LIGHT FOR VEHICLES

Melvin L. Riggs, Logan, W. Va.

Application July 21, 1950, Serial No. 175,063

2 Claims. (Cl. 180—1)

This invention relates to vehicle lamps, and more particularly to a fog-lamp arrangement for a motor vehicle.

A main object of the invention is to provide a novel and improved fog-lamp system for motor vehicles, said system being very simple, involving only a few parts, and being easy to install.

A further object of the invention is to provide an improved fog-lamp apparatus for motor vehicles, said apparatus involving relatively few components, being electrically operated from the vehicle dashboard, being operated by a single control element, providing automatic indications of the positions of the fog-lamp elements of the apparatus, and being easy to install on motor vehicles of conventional design.

A still further object of the invention is to provide an improved fog-lamp attachment for a motor vehicle wherein the lamp elements may be normally housed in out-of-the-way, protected positions and may be readily swung to operative positions when their use is required, the arrangement of the fog-lamp elements being such that very efficient illumination of the roadway ahead of the vehicle is obtained, the light beams from the fog-lamp elements being directed under the fog by virtue of the locations of the lamps on the vehicle.

Further objects and advantages of the invention will become apparent from the following description and claims, and from the accompanying drawings, wherein:

Figure 1 is a front elevational view, partly broken away, of a motor vehicle equipped with an improved fog-lamp installation according to the present invention;

Figure 2 is a fragmentary side elevational view, partly broken away, of the forward portion of the motor vehicle of Figure 1, showing the elements of the fog-lamp installation shown in Figure 1;

Figure 3 is a partial top view of the forward portion of the motor vehicle of Figures 1 and 2, showing the components of the fog-lamp apparatus;

Figure 4 is an enlarged cross-sectional detail view taken on line 4—4 of Figure 3;

Figure 5 is an enlarged vertical cross-sectional detail view taken through the driving coupling connecting the operating motor of the fog-lamp apparatus to the supporting shaft of the fog-lamps;

Figure 6 is an enlarged cross-sectional detail view taken on line 6—6 of Figure 5;

Figure 7 is a schematic wiring diagram showing the electrical connections of the fog-lamp apparatus of Figures 1 to 6.

Referring to the drawings, 11 designates the forward portion of a conventional automobile, said automobile being provided with a frame 12, to the forward end of which is secured the transversely extending front bumper 13. Secured to the frame and to the bumper is a horizontal splash plate 14 which covers the forward space between the automobile radiator, shown at 15, and the bumper 13, as clearly shown in Figure 2. The bumper 13 is connected to the frame 12 by the pairs of forwardly extending supporting bars 16 bolted or otherwise rigidly secured to the forward ends of the frame 12 one at each side thereof. The structure thus far described is conventional.

Clampingly secured one to each pair of support bars 16, 16 are the inwardly directed bracket members 17, 17, said bracket members being hooked over the support bars 16, 16 and rigidly secured thereto by clamping bolts 18 arranged as shown in Figure 4, said clamping bolts passing through the free end portion of the hook of the bracket and being threaded into the body portion thereof, as clearly illustrated in Figure 4. As further shown in Figure 4, an abutment sleeve 19 may be provided on each bolt 18 to limit the amount of clamping force which said bolt may exert on the hook element of the bracket. Adjustably secured in each bracket is a bearing block 20, said block having a circular flanged head 21 received in a recess correspondingly formed in the associated bracket 17 and being clamped therein by a clamping screw 22, as shown in Figure 4, the bracket 17 being slotted at 23 to provide flexibility for the clamping portions of the bracket with respect to the head 21.

Rotatably mounted in the opposing bearing blocks 20 are the respective transverse shaft members 24, 24, said shaft members being located in alignment with each other and the inner ends of said shaft members being connected by a sleeve member 25 receiving said inner ends and adjustably secured thereto by the respective set screws 26, 26 provided on the sleeve member. The outer ends of the shaft members 24, 24 are freely rotatable in the bearing blocks 20, suitable lubricating fittings 27 being preferably provided in said bearing blocks to insure free rotation of the shaft members.

As shown in Figure 2, the axis of the shaft members 24, 24 is located beneath the splash plate 14 and a substantial distance behind the bumper 13. Secured to the respective shaft elements 24 are the arms 28, each arm carrying a fog-lamp unit 29. The fog-lamp units 29 are arranged so that when the arms 28 are in depending, vertical positions below the shafts 24, the lamp units will be directed forwardly of the vehicle, as shown in Figure 2, and are further arranged so that by rotating the shafts 24 counterclockwise, as viewed in Figure 2, the lamps may be moved to upwardly facing housed positions located immediately behind the bumper 13 and beneath the splash plate 14. The housed position of one of the fog-lamp units is shown in dotted view in the lower portion of Figure 5. A cushioning pad 30 of rubber or similar resilient material is secured to the bottom surface of the splash plate 14 immediately above the housed position of each fog-lamp element, so that the lens of the fog-lamp will not be damaged when the fog-lamp is swung to its housed or retracted position.

Secured to the upper portion of the radiator of the vehicle and to the back portion of the grille is a bracket bar 31, to the intermediate portion of which is secured a depending bracket element 32 carrying the motor and gear housing 33. Designated at 34 is an electric motor, contained in one portion of the housing 33, and designated at 35 is a worm gear rotatably mounted in the housing 33 on a vertical axis and engaged by a worm, not shown, carried by the shaft of the motor 34. The shaft of gear 35 is shown at 36, and secured to said shaft is an internally threaded, depending sleeve 37 which receives a threaded rod 38. Pivotally connected to the lower end of the rod 38 at 39 is a link bar 40 which extends through an opening 41 in splash plate 14. The lower end of the link bar 40 is pivotally connected as at 42 to an arm 42' rigidly secured to the sleeve member 25. By energizing the motor 34 in one direction, the arm 42' may be rotated from the full line position thereof shown in Figure 5 to the dotted line position thereof in a counterclockwise direction, as viewed in Figure 5, thereby moving the fog-lamp elements from the depending or extended operative position to the housed or retracted dotted line position shown in Figure 5. By energizing the motor 34 in the opposite direction, the fog-lamp units may be moved from their retracted position to their extended, forwardly facing positions, shown in Figure 2. Energization of motor 34 causes the sleeve member 37 to be rotated, whereby the threaded rod 38 is moved vertically in one direction or the other, depending upon the direction of rotation of the motor 34.

Referring now to Figure 7, it will be seen that the motor 34 has its respective terminals connected to the respective wires 43 and 44. The wires 43 and 44 are connected to respective poles 45 and 46 of a two-pole, three-position switch mounted on the motor vehicle dashboard. The positive terminal of the vehicle battery 47 is connected to a wire 48, which in turn is connected to respective contacts 49 and 50 of the poles 45 and 46. Pole 46 engages contact 49 when the poles 45 and 46 are moved to the left from the position shown in Figure 7, and pole 45 engages contact 50 when the switch poles are moved to the right from the position shown in Figure 7. The negative terminal of the battery 47 is grounded, as are the inner contacts 51 and 52 of the switch. It will be apparent from Figure 7 that when the switch poles are moved to the left, as viewed in Figure 7, the motor 34 will be energized for rotation in one direction, and when switch poles are moved to the right, the polarity of the applied voltage on the motor 34 is reversed, causing the direction of rotation of the motor shaft to be reversed. Designated at 53 is a warning lamp which is mounted on the vehicle dashboard, one terminal of said lamp being connected to the wire 44, and the other terminal of said lamp being connected by the wire 54 to respective parallel-connected switches 55, 56 and a wire 57 to the wire 43. The switches 55, 56 are push-button switches and are normally open. The switch 55 is mounted on the splash plate 14 and is arranged so that its actuating button will be engaged by the end of an arm 58 carried by one of the shaft elements 24, when the fog-lamp units 29 are in depending, forwardly facing positions. The other switch 56 is likewise mounted on the splash plate 14 and is arranged so that its actuating button will be engaged by the end of an arm 59 carried by one of the shaft elements 24, when the fog-lamp elements are moved to their openly facing, housed positions. Therefore, when the lamp elements 29 are in their depending, operative positions, the switch 55 is closed, thereby energizing the signal lamp 53, and said signal lamp becomes similarly energized when the fog-lamps have been moved to their housed inoperative positions. The energization of signal lamp 53 informs the operator that the fog-lamps have been moved completely from one position to the other, whereby the motor 34 should be de-energized. Therefore, as soon as the operator observes illumination of the warning lamp 53, he moves the switch unit 45, 46 to its open-circuit position shown in Figure 7. To swing the lamps from their housed, inoperative positions to their depending, forwardly facing positions, the operator moves the switch poles 45, 46 into engagement with one set of contacts, and to return the fog-lamp units to their housed, inoperative positions, the operator moves the switch elements 45, 46 into engagement with the opposite set of contacts. When the signal lamp 53 becomes illuminated, the operator moves the switch poles 45, 46 into neutral, open-circuit position. As shown in Figure 7, the lamps 29, 29 are connected in parallel between the wire 48 and ground, and are controlled by an independent switch 60 provided in the wire 48, as shown.

While a specific embodiment of an improved fog-lamp apparatus for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with an automotive vehicle having a frame, and bumper supporting bars extending forwardly from said frame and one at each side of the latter, a retractile fog lamp assembly comprising brackets secured one to each of said bumper supporting bars, a shaft journaled at its ends in said brackets, a plurality of arms rigidly secured to and projecting radially from said shaft at locations spaced apart therealong, fog lamps rigidly secured to the outer extremity of certain of said arms and said certain arms depending from said shaft one adjacent each end of the latter, each of said lamps secured to said certain arms disposed in a forwardly facing position when said certain arms depend from said shaft whereby said lamps are movable by rotation of said shaft between an extended position in which they are disposed in a forwardly facing position directly below said shaft and a retracted condition in which they are disposed in upwardly facing position forwardly of said shaft, said means comprising a bracket bar carried by said frame above said shaft, a gear carried by said bracket bar, a reversible electric motor connected to said gear for driving the latter in opposite directions, variable length mechanisms connecting said gear to one of said arms on said shaft disposed intermediate the length of the latter for extending said fog lamps upon rotation of said gear by said motor in one direction and retracting said fog lamps upon rotation of said gear by said motor in the opposite direction, and an energizing circuit for said motor.

2. In combination with an automotive vehicle having a frame, and bumper supporting bars extending forwardly from said frame one at each side of the latter, a retractile fog lamp assembly comprising brackets secured one to each of said bumper supporting bars, a shaft journaled at its ends in said brackets, a plurality of arms rigidly secured to and projecting radially from said shaft at locations spaced apart therealong, fog lamps secured to certain of said arms one adjacent each end of said shaft, each of said lamps secured to said certain arms disposed in a forwardly facing position when said certain arms depend from said shaft, means whereby said lamps are movable by rotation of said shaft between an extended position in which they are disposed in a forwardly facing position directly below said shaft and a retracted condition in which they are disposed in upwardly facing position forwardly of said shaft, said means comprising a bracket bar carried by said frame above said shaft, a gear carried by said bracket bar, a reversible electric motor connected to said gear for driving the latter in opposite directions, variable length mechanisms connecting said gear to one of said arms on said shaft disposed intermediate the length of the latter for extending said fog lamps upon rotation of said gear by said motor in one direction and retracting said fog lamps upon rotation of said gear by said motor in the opposite direction, an energizing circuit for said motor, an energizing circuit for said fog lamps, and signal means on said vehicle and operated by at least one of said certain arms when said lamps are in their fully extended or fully retracted position to indicate the limit of movement of said lamps in corresponding directions.

MELVIN L. RIGGS.

References Cited in the file of this patent

UNITED STATES PATENTS

| Number | Name | Date |
| --- | --- | --- |
| 1,628,193 | Riehl | May 10, 1927 |
| 1,655,851 | Weil | Jan. 10, 1928 |
| 1,716,546 | Fry | June 11, 1929 |
| 1,842,800 | Rhodes | Jan. 26, 1932 |
| 1,988,894 | Germain | Jan. 22, 1935 |
| 2,036,435 | Phelps | Apr. 7, 1936 |
| 2,140,855 | Scott | Dec. 20, 1938 |
| 2,214,447 | Bave | Sept. 10, 1940 |
| 2,286,338 | Bruno | June 16, 1942 |
| 2,317,619 | Kramer | Apr. 27, 1943 |
| 2,443,007 | Katz | June 8, 1948 |